(12) United States Patent
Assadollahi et al.

(10) Patent No.: US 9,230,012 B2
(45) Date of Patent: Jan. 5, 2016

(54) COMPACT VISUALISATION OF SEARCH STRINGS FOR THE SELECTION OF RELATED INFORMATION SOURCES

(75) Inventors: Ramin Assadollahi, Munich (DE); Stefan Bordag, Munich (DE)

(73) Assignee: EXB ASSET MANAGEMENT GMBH, Munich (DE)

( * ) Notice: Subject to any disclaimer, the term of this patent is extended or adjusted under 35 U.S.C. 154(b) by 998 days.

(21) Appl. No.: 13/371,778

(22) Filed: Feb. 13, 2012

(65) Prior Publication Data

US 2012/0209830 A1 Aug. 16, 2012

(30) Foreign Application Priority Data

Feb. 11, 2011 (EP) ..................................... 11001128

(51) Int. Cl.
*G06F 17/30* (2006.01)
(52) U.S. Cl.
CPC ................. *G06F 17/30643* (2013.01)
(58) Field of Classification Search
CPC ................................................ G06F 17/30643
USPC ........................................................ 707/713
See application file for complete search history.

(56) References Cited

U.S. PATENT DOCUMENTS

| | | | |
|---|---|---|---|
| 7,610,185 | B1 | 10/2009 | Ershov |
| 8,229,948 | B1 * | 7/2012 | Ershov ........................ 707/765 |
| 2006/0117003 | A1 | 6/2006 | Ortega et al. |
| 2009/0204582 | A1 * | 8/2009 | Grandhi et al. .................... 707/3 |
| 2010/0138428 | A1 | 6/2010 | Uchino et al. |

FOREIGN PATENT DOCUMENTS

EP 2131290 A1 9/2009

OTHER PUBLICATIONS

European Patent Office, "The extended European search report", dated Aug. 8, 2011, issued in European Application No. 11001128.5, 9 pages.
"Venn Diagrams Basic", Retrieved from the Internet: URL:http://web.archive.org/web/20090412045223/http://www.graphic.org/venbas.html, Retrieved on Jun. 16, 2011, 2 pages.

(Continued)

*Primary Examiner* — Alexey Shmatov
(74) *Attorney, Agent, or Firm* — Hanley, Flight & Zimmerman, LLC

(57) ABSTRACT

The application relates to a method for facilitating the selection of an information source, comprising: providing two search strings to an electronic device; obtaining strings and relationship values, wherein each relationship value defines a degree of semantic relationship between two strings or a string and a search string and wherein at least some of the strings match with elements in the information sources; and displaying at least some of the matching strings on a two-dimensional map. The map comprises a first, a second and a third region, the first region comprising matching strings that have a non-zero relationship value only with regard to the first search string, the second region comprising matching strings that have a non-zero relationship value only with regard to the second search string and the third region comprising matching strings that have non-zero relationship values with regard to the first and the second search string.

14 Claims, 4 Drawing Sheets

(56) References Cited

OTHER PUBLICATIONS

Jackie Assa et al, "RMAP: A System for Visualizing Data in Multi-dimensional Relevance Space", The Visual Computer, vol. 15, No. 5, pp. 217-234, Aug. 19, 1999, 18 pages.

Yasufumi Takama et al., "Application of Keyword Map-based Relevance Feedback to Interactive Blog Search", Active Media Technology, 2005. (AMT 2005). Proceedings of the 2005 International Conference on Takamatsu, Kagawa, Japan, May 19-21, 2005, Piscataway, NJ, U.S.A., IEEE, May 19, 2005, pp. 112-115.

* cited by examiner

COMPACT VISUALISATION OF SEARCH STRINGS FOR THE SELECTION OF RELATED INFORMATION SOURCES

FILED OF INVENTION

The present invention relates to the field of information retrieval from a plurality of information sources. More particularly, the present invention relates to a compact visualization of search strings which can be used to search for information sources from a plurality of information sources.

BACKGROUND

When browsing through text sources such as for example document collections, it is not a simple task to find the right document for a certain topic. Search engines only provide a list of documents matching a query. By using a list of keywords that relate to the expected content of the sought document, the list of documents can be further reduced. However, even a long list of keywords may not prevent the user from manually scanning through the remaining documents to find the best match.

SUMMARY

The present invention is directed at improving the document selection process by carving out results that are related but not of interest. It gives the user the possibility to specify at least two search strings, e.g. keywords, and to contrast associations between the at least two keywords, in order to evaluate and display further keywords, that make the differences and similarities of the documents apparent when being displayed in the form of a map.

According to an aspect, the present application is directed at facilitating the selection of an information source from a plurality of information sources. The information sources may comprise text sources such as document collections, emails, web pages or any other source comprising symbols that can be interpreted. The information sources may be stored locally on an electronic device. Alternatively, at least some of the information sources may be stored remotely to the electronic device, e.g. at a server. The information sources that are being stored remotely to the electronic device may be accessible by the electronic device over a network, e.g. a wireless network or a wired network. For example, the electronic device may be a mobile electronic device which communicates with the internet using radio communications.

The electronic device may be provided with a plurality of search strings. For example, the device may be provided with two search strings. The search strings may comprise one or more words and/or symbols. The search strings may be entered by the user of the electronic device. For example, the user may actuate a sequence of keys on a keyboard of the device. When the electronic device is a mobile electronic device, the keyboard of the mobile electronic device may be a reduced keyboard. Alternatively, the user may enter search strings over a touch screen of the electronic device.

The electronic device may obtain strings and relationship values. The strings and relationship values may be obtained from a memory of the device or from a source remote to the device. The strings may be words or sequences of characters and/or symbols. At least some or each of the relationship values may define a degree of semantic relationship between two strings. The relationship values may be numerical values. Then, a positive numerical value may indicate that two strings have a relationship and a zero numerical value may indicate that the strings do not have a relationship. The relationship values may be calculated using a general text corpus. Alternatively, the relationship values may be calculated using information sources stored in the memory of the device. In both cases, at least some of the strings may match with elements in the information sources. At least some of the strings may equally match with the search strings. The strings and/or the relationship values may be part of one or more relationship databases. In this case, each obtained database may comprise at least one of the search strings.

At least some of the strings that match with elements in the information sources may be displayed on a two-dimensional map. The map may comprise different regions. For example, the map may comprise a first, a second and a third region. The first region may comprise some of the matching strings that have a non-zero relationship value only with regard to the first search string. In other words, the strings that have only a relationship to the first search string are placed in the first region. The second region may comprise matching strings that have a non-zero relationship value only with regard to the second search string. Hence, the second region comprises the strings that are related only to the second search string. The third region may comprise matching strings that have non-zero relationship values with regard to the first and the second search string. In other words, the third region is provided with strings that have a relationship to the first search string and the second search string. Hence, the map indicates to which of the search strings, a string is related.

The user may select a string form the displayed matching strings. For example, when using a touch screen the user may tab onto a string. Alternatively, the user may navigate to the string using a navigation tool on the electronic device and then confirm a selection. When the electronic device receives the selection, the electronic device may search for information sources that comprise the selected matching string. For example, the electronic device may search for documents that contain the selected matching string. Alternatively, the electronic device may search for documents that contain the selected matching string and one of the search strings. In particular the user may add the selected matching string to one of the search strings, e.g. by dragging and dropping the selected matching string onto one of the search strings. As a further alternative, the electronic device may restart and refine the procedure using the modified search string.

According to an aspect, the calculation of a relationship value for two strings may be based, at least in part, on comparing a frequency distribution of one of the two strings in a text source having a known semantic relation to the other string of the two strings, with a global frequency distribution of the one of the two strings in a general text corpus. For example, there may exist a document entitled "sports". It is assumed that said document contains more strings, i.e. words, which are related to the concept of "sport" than would be usual in a large corpus. Hence, words that are contained in the document relatively more often than in a large corpus, are assumed to have a relation to the concept "sport" and are thus assigned a non-negative relationship value with regard to the string "sport". Similarly, the words may be assigned non-negative relationship values with regard to each other, since they relate to the same concept.

According to an aspect, the calculation of a relationship value for two strings may be based on analyzing distances of two strings in a text corpus. Heretofore, a word window may be defined. The word window may have a specific length. For example, the word window may be 4 words long. When the word window is moved over a text, it may be counted how often two strings appear in the word window at the same time.

When two strings appear often in close proximity, it is assumed that they are related to each other.

According to an aspect, the search strings may be displayed at specific points on the map. For example, the search strings may be placed opposite to each other at certain distances from the center of the map. The position of a matching string on the map may be determined relative to the position of the search strings. The determination may be based on the relationship values of the matching strings with regard to the search strings.

For example, the position of the matching string may be determined by defining search string concentric closed curves on the map plane around the search strings. Each closed curve may represent a specific numeric value for a relationship value of the matching string to one of the search strings. The numeric values may decrease from the inner curves to the outer curves so that strings that are strongly related with a search string may be placed close to the search string and strings that are only weakly related with a search string may be placed at a greater distance from the search string. A matching string may be positioned upon an intersection point of each curve which corresponds to a relationship value of the matching string.

In case there exists no intersection point for the curves which correspond to a relationship value of the matching string, the matching string may be positioned upon a connection line between the search strings. In this case, the position of the matching string upon the connection line may be determined according to the relationship values. This allows for indicating to which search string, the matching string is more closely related. When the search string is more closely related to the first search string, it may be positioned closer to the first search string.

According to an aspect, the map may have the shape of a rectangle and the first, second and third regions may be divided by two curves. The curves may be lines which are parallel to a first side of the rectangle. The curves or lines may be fully or partially transparent or broken. The first, second and third regions may be divided into six sub-regions by a further curve. The further curve may be fully or partially transparent or broken. The further curve may be a further line that is parallel to a second side of the rectangle. A matching string may be placed at one side of the further line or at another side of the further line, depending on a property of the matching string. The property of the matching string may be a characteristic which is independent from its relation to the search string, e.g. its emotionality. For example, "good" strings may be placed at one side of the further curve and "bad" strings may be placed at another side of the further curve.

According to an aspect, small relationship values may be set to zero in order to eliminate irrelevant or artificial relationships.

According to an aspect, the strings and the relationship values may be obtained from at least one relationship database where a string and its corresponding relationship values are stored as database entries.

According to an aspect, the electronic device may receive a selection of a displayed matching string. The electronic device may then replace one search string with the selected matching string. Alternatively, the electronic device may add the selected matching search string to one of the search strings. Then, the procedure may be repeated with the replaced/modified search string. Thus, the procedure can be iteratively refined up to a point, where no further refinement is required and the search strings may be used to search the information sources.

According to an aspect, the user may zoom into a portion of the map. When the user zooms into a portion of the map, the selected portion may be enlarged on the display of the electronic device. In response to zooming into a region, additional strings may be displayed on the map, within the region. When the user zooms out of the region, the additional strings may be removed from the map.

According to an aspect, computer readable instructions for the above described method may be stored on a computer readable medium. Hence, the computer readable medium may comprise computer readable instructions, which, when carried out by a processor on a computer, perform any combination of the steps of the method described above.

According to an aspect, the above described method may be carried out by a processor of a computer. The processor may thus be adapted to carry out any combination of the steps of the method described above.

BRIEF DESCRIPTION OF THE FIGURES

Some embodiments of apparatus and method in accordance with embodiments of the present invention are now described, by way of example only, and with reference to the accompanying drawings in which.

DETAILED DESCRIPTION

The present application revolves around a system and method for displaying differences and commonalities between two or more concepts of data entities such as documents, emails, web pages etc. The concepts may be expressed in various ways, for example in the form of strings. The system and method may be used to select related documents that have one or the other concept as topic or commonalities between the two concepts as topic.

When analyzing some possibly related amounts of text, strings or words may be extracted that are associated in some way to the concept of the text. For example, a book on health may comprise strings or words that are related to the concept of health. The concept may be represented by a word, a phrase or some other construct that relates to the words then displayed. For example, the word health which represents the concept of health may relate to the words "care", "patient" or "insurance" found in a book on the concept of health. Thus, when a user would like to make a selection among a collection of documents that relate to the concept of health, these words could be presented to the user to make a selection among the collection of documents in order to reduce their number for reading.

The displayed words thus express in what contexts the concept is used or which words express similar concepts. For example, for "health" words such as "insurance", "care", "patients" and "expense" would be expected to be found in documents with health as topic or similar topics.

Depending on the metric used, the retrieved words may be ranked according to some distance or intensity measure, dependent on some notion of strength of the association to the concepts analyzed such that less related words are further away than more strongly related words and/or are presented in lighter colors when they are less related and stronger colors when related more strongly.

By this, the semantic context or associations a concept has, are illustrated. This may be useful in cases where there is no knowledge about the concept or the concept associations are somehow used for navigation purposes, for example when trying to find a certain document in a document collection, or intuition about the general meaning of a concept is compared against the true usage of that concept. However, it is impossible to find documents that contrast with the concept analyzed, as only similar documents are found.

The present application addresses this short coming by assisting in specifying what a concept is not related to, which naturally entails a direction in which an information need goes, because otherwise the answer would be trivial: everything that is not connected to the concept.

Figure 1:
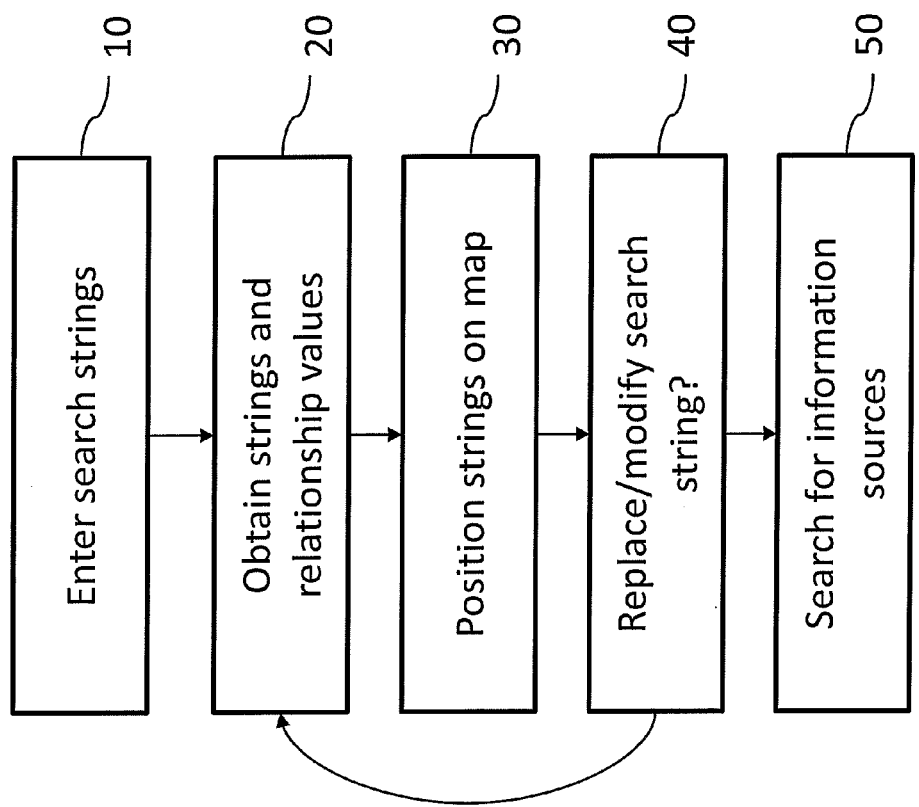
FIG. 1 schematically illustrates a flow chart of a method for facilitating the selection of an information source from a plurality of information sources.

FIG. 1 shows a flow chart which schematically illustrates how a map is used for facilitating the selection of an information source from a plurality of information sources using concepts that relate to information sources.

According to FIG. 1, a user may specify a number of information sources from a plurality of information sources the user wishes to search. The information sources may be text sources and the user may hence select a number of text sources from a plurality of text sources. The text sources may be stored in the memory of an electronic device. Alternatively, some or all of the text sources may be stored remotely from the electronic device and be accessible to the electronic device over a network. The text sources may comprise documents of different languages and/or formats, for example scientific books in electronic form, news articles from an online store, emails stored in an email account, web pages, etc.

The user may enter (10) into the device at least two concepts, e.g. in the form of search strings or keywords, where the user expects some relationship between the keywords and the specified text sources. The keywords may be terms specific to a domain which has a relation to at least some of the specified text sources. The keywords may be in the same language or in different languages and also comprise technical terms that are commonly used in different languages. In other words, the user may input two concepts to the device, where some relationship between the concepts and the information sources is expected.

The electronic device may be provided with or obtain (20) strings and relationship values, each relationship value indicating the semantic relationship of two strings, i.e. words or character and/or symbol sequences. The strings and relationship values may be determined on the fly from the information sources or be part of one or more relationship databases.

The relationship databases may be retrieved from the memory of the device or may be retrieved from one or more remote sources via a network. Typically, each retrieved relationship database will relate to at least one of the keywords. The relationship databases store strings, e.g. words, together with relationship values in entries of the relationship database. For example, when the user has entered the keyword "sport" to the electronic device, the electronic device may retrieve one or more relationship databases that are specific on the topic. For example, the electronic device may derive a "soccer" relationship database and/or a "basketball" relationship database. The "soccer" database may comprise such words as "ball", "goal", "foul" which may have a high relationship value with regard to the keyword "soccer" and with regard to each other and words such as "referee" and "world championship" that have a lower relationship value with regard to the keyword "soccer".

The relationship databases may be pre-computed or established on the fly, e.g. by analyzing a text corpus and evaluating which words in the text corpus are used in the same text portion, in spatial proximity. The relationship databases may be general-purpose relationship databases and/or domain-specific databases. The domain-specific databases may comprise only words that relate to a specific domain, such as for example the domain of "soccer" while the general-purpose databases may comprise words that are used in a wider relationship than only the words that are stored in the domain-specific databases. For example, if there exists no domain-specific relationship database for the keyword "soccer", the general-purpose database "sports" which may comprise the keyword "soccer", and/or the general-purpose database "school" which may comprise the keyword "soccer", may be retrieved by the electronic device.

In other words, the domain-specific databases are databases that are named after a keyword and are thus preferably retrieved when the keyword is entered, while the general-purpose databases are not named after the keyword but comprise the keyword, e.g. as part of their word list. Of course, the classification general-purpose and domain-specific can only be made with regard to a specific set of keywords.

In order to keep the databases compact, words which do not relate to a specific topic, but will nevertheless be present in a great variety of text portions of the corpus, e.g. words like "the" "for", etc. will not be added to the databases or removed from the databases.

Optionally, the electronic device may match a number of words of at least some of the selected relationship databases to words in the specified documents. Typically, words in the relationship databases having a higher relationship value with regard to the keywords will be given preference.

The strings may be positioned (30) on a compact map showing their relationship to the search strings, i.e. whether they are related to only one of the concepts, whether they are related to both concepts. The compact map may comprise the strings in the form of links, so that the user can navigate to respective text portions comprising the matches by activating the link. Alternatively, a selected matching string may replace or be added to (40) one of the search strings and the procedure may be repeated with the new search strings.

The procedure may be used to search for (50) related documents that have one or the other concept as topic or commonalities between the two concepts as topic.

Figure 2:
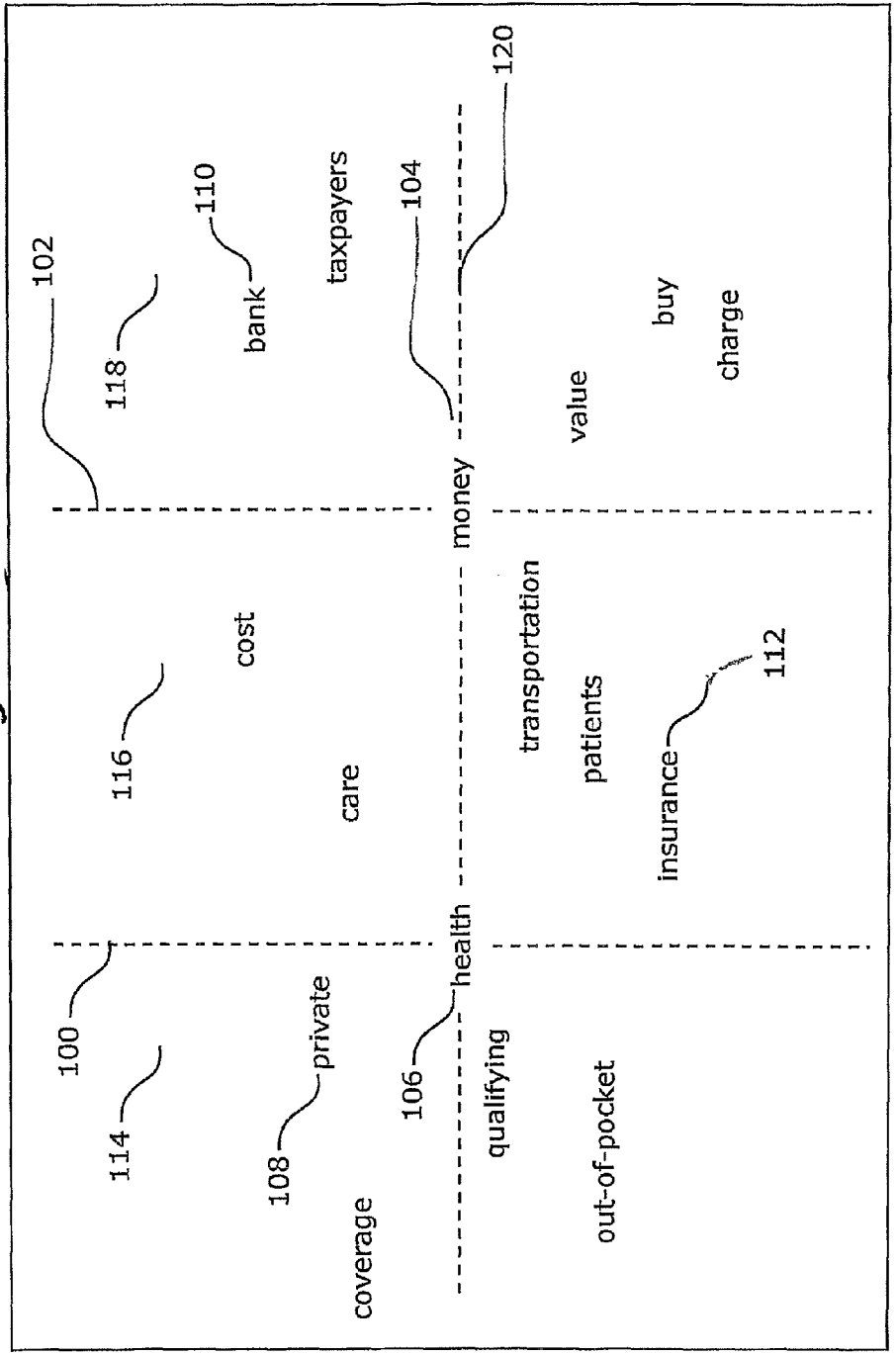
FIG. 2 schematically illustrates a compact visualization of search strings for the selection of related information sources from a plurality of information sources.

An example for a map is shown in FIG. 2 which schematically illustrates a compact visualization of strings for the selection of related information sources from a plurality of information sources. FIG. 2 contrasts the search strings "health" and "money" and shows what is exclusive to either concept, "health" compared to "money" or vice versa.

With a second concept, the present application is able to reveal differences between the two concepts of "health" and "money" so that the user is able to understand what is related to the first, the second or both concepts. Knowing these relationships, it may be easier for the user to "shape" the space of documents to select. Certainly, this contrastive method can be used for more than two concepts, but for the sake of simplicity, further description of the application focuses on two concepts.

The present application imposes an objective spatial order on the results of the analysis. In FIG. 2, the display area is divided in three areas (114, 116, 118) separated by two (imaginary) borders (100 and 102). Each border relates to one of the two concepts to be contrasted: health (106) is on the left, money (104) is on the right. Note that these two concepts and their borders define exclusive spaces (areas 114 and 118) and a common space (area 116).

As described above, computer program may analyze a corpus of text and extract three groups of strings. The three groups of strings may also be referred to as:
1. Units exclusively related to the first concept (i.e. 108 for 106)
2. Units exclusively related to the second concept (i.e. 110 for 104)
3. Units related to both concepts (i.e. 110 for 104 and 106)

The strings may be arbitrary linguistic units such as morphemes, words, phrases or even entire entities such as documents (for example represented by their name).

The groups of units may then be presented in their respective part of the map, i.e. units that only belong to concept 106 may be presented in area (114; common units (i.e. units related to both concepts) may be presented in the area 116, units exclusive to concept 104 may be presented in area 118.

In this way, the user would very easily be able to grasp at a glance differences and commonalities between the two concepts analyzed.

In one embodiment, it is also possible to have some or all of the areas (114, 116, and 118) overlap to some extent, depending on the particular usage scenario.

Additionally, the location of the concepts may be freely chosen and de- or increased sizes of the corresponding areas can be naturally used to display more information about the common concepts if the middle area becomes larger, for example.

In one embodiment, the borders may not have to be perpendicular to the display border 102, i.e. they can be rotated by moving the two concepts 106 and 108 while keeping the two borders 100 and 102 in parallel and co-rotating all units.

In one embodiment, the units may actually be positioned along the horizontal axis according to the degree of their relatedness to the concepts, i.e. a unit would be in the distance of 30% between concept 106 and 70% from concept 104 because it is more similar to concept 104 than to concept 106, for example.

In one embodiment, the units may be positioned along the vertical axis depending on the "generality" of the word, i.e. how unrelated the word is compared to both of the concepts. Semantically rather specific units would be positioned near the border 120, whereas more general units would be positioned near the display border 102.

In one embodiment, units could further be analyzed on properties of the units, e.g. their emotional content, and be divided in positive (e.g. "good", "fun", "great") and negative ("rotten", "bad") and be positioned above (e.g. positive) or below (e.g. negative) the border 120.

Additionally any number of classifications (such as positive/negative, abstract/concrete, older/newer, etc.) may be used to augment the positioning of the words/units, for example to place words associated with positive emotions more to the top, or negative emotions more to the bottom. For this either a look-up in a database storing the corresponding information can be used, or a classification. In both cases a strength value is returned that expresses how strongly any particular unit belongs into any of the two classes. The look up data base may be either created manually beforehand, or using a classificator again.

A classificatory is a process which, based on features such as significant co-occurrences, or other features decides into which predefined class some unit belongs. Hence, if two classes such as positive and negative are initiated with a number of example units or documents, a classificatory extracts the most significant features for either class and can later compare these features to the features of the unit to be decided. If the features of some particular class are most similar to the features of the unit to be decided, then this is the class to be chosen.

In one embodiment, units may be analyzed with regards to their semantic similarity to each other and be positioned in vicinity, for example "buy" and "value".

One skilled in the art will acknowledge that some or all of above described positioning procedures may be combined in arbitrary ways to generate progressively more precisely positioned and objective topographies of the units in the map. This could be achieved by generating scores, e.g. relationship values, (or later in the processing stage: coordinates of the map) resulting from these various methods and then converged, for example by adding them, averaging them or similar computations.

An implementation may be implemented on touch screens and be used in the aforementioned retrieval process. The basic concepts 104 and 106 may be retrieved by the user or entered manually. In one embodiment, the user may touch these two words simultaneously (using a "multi-touch screen") which would automatically start the computation of the units. The units may then be displayed and user then selects one of these units to do further retrieval operations, for example view documents that contain it as well as possibly one or all of the basic concepts.

Summing up the aforesaid, an implementation may comprise two parts:
concept analysis; and
unit positioning.

A concept analysis is a procedure which extracts other concepts or units that are specific to some input concept, e.g. a search string, and assigns relationship values to the other concepts or units. It is possible to use a variety of methods such as a differential analysis, a co-occurrence analysis, an analysis based on computing similarity or any combination of these.

A differential analysis is a procedure which compares a local frequency distribution against a global frequency distribution. For example, the words or phrases in a small set of related documents are likely to have a different distribution than the words in an entire collection of thousands of documents. Using a significance measure it is possible to automatically distinguish such units which are more specific to the local set of documents as compared to the global set—in a way that does not directly reflect their local frequency. Hence, even though a word such as "health" appears only three times in some document and a word such as "the" appears 50 times, the fact that in some background corpus "health" appears merely 5 times whereas "the" appears one million times clearly makes "health" much more specific to the document at hand than "the" despite the much higher local frequency of "the".

A co-occurrence analysis is a method that observes which units appear more often near each other than would be expected assuming a random distribution of those units. Typically, a mathematical null hypothesis is tested against the observed distribution by use of a statistical significance measure such as the mutual information measure, the log-likelihood or the Poisson distribution. The extent to which the co-occurrence count of two units deviates from the null hypothesis represents the strength of the association between these two units. However, existing systems either depend on a language-specific sentence separation module, or use short context windows, but run into the problem of too high-frequent units receiving very high ranks.

An analysis computing the similarity of units, e.g. words, uses observable features of the units to compare them with each other. The method should be language-independent. The implementation therefore makes use of a heuristic method to compare among other features the co-occurrences of the units, and where available the sub-units of the unit in question, for example the words in a document, if documents are compared. Repeating this process for all possible pairings of all units allows compiling a ranking of the most similar units to any input unit. These similarity values may also be based on the usage of these units.

The procedure to obtain a simulation of semantic similarity of words may use the linguistic hypothesis that semantically similar words must be interchangeable to some extent. Hence, if we have a sentence "The sun shines" we might also have the sentence "The lamp shines". From this we could conclude that "sun" and "lamp" are semantically similar somehow. For most (including the present) purposes it is irrelevant of which semantic type this similarity is, so it could equally be synonymy, antonymy, hypernymy or meronymy. To compute such interchangeability efficiently we observe, for each input word, which other words are the words that co-occur most significantly with the input word. For example in a database of German texts we observe that the word "Handy" co-occurs with these words where the numbers represent a significance rating (i.e. the strength of the co-occurrence events):

my 18274
rings 16883
SMS 13167
per 12400
ringed 11287
phoning 9014
number 6634
landline 6094

Once we have the co-occurrences of all words, we can go on to compare each word with each other using these co-occurrences as features. As a result, for "Handy" we get as the most similar words:

telephone 2150
per 1250
internet 1200
SMS 1200
MMS 1200
called 1150
call 950

Naturally, the same procedure can be applied to other units, not just words, as long as it is possible to observe these units to co-occur with something. For example, phrases co-occur with words or phrases. Words in titles of pictures co-occur with these pictures and so on.

Combinations of any of these three or more analyses are possible by combining the retrieved and ranked units in various ways, for example using a rank combination method.

A unit positioning system is a procedure that, given some defined spatial area, assigns positions to the units such that possible dependencies are represented in an intuitive way. Dependencies may be of repulsive nature (if two units are not related to each other) or attractive nature (if two units are related to each other). Dependencies may exist among the units themselves put into a set as a result of the previously described process of finding the most relevant units to input concepts, i.e. the search strings. Dependencies may also exist between said units and the input concept directly. All dependencies may be either binary (that is they exist or they don't exist), or they may be of finer granularity, e.g. represented by a numerical value such as a relationship value. Hence, a unit represented by the word "shelter" may be less relevant to the concept "money" but more relevant to the concept "health" and hence the positioning system would place "shelter" nearer to "health".

Figure 3:
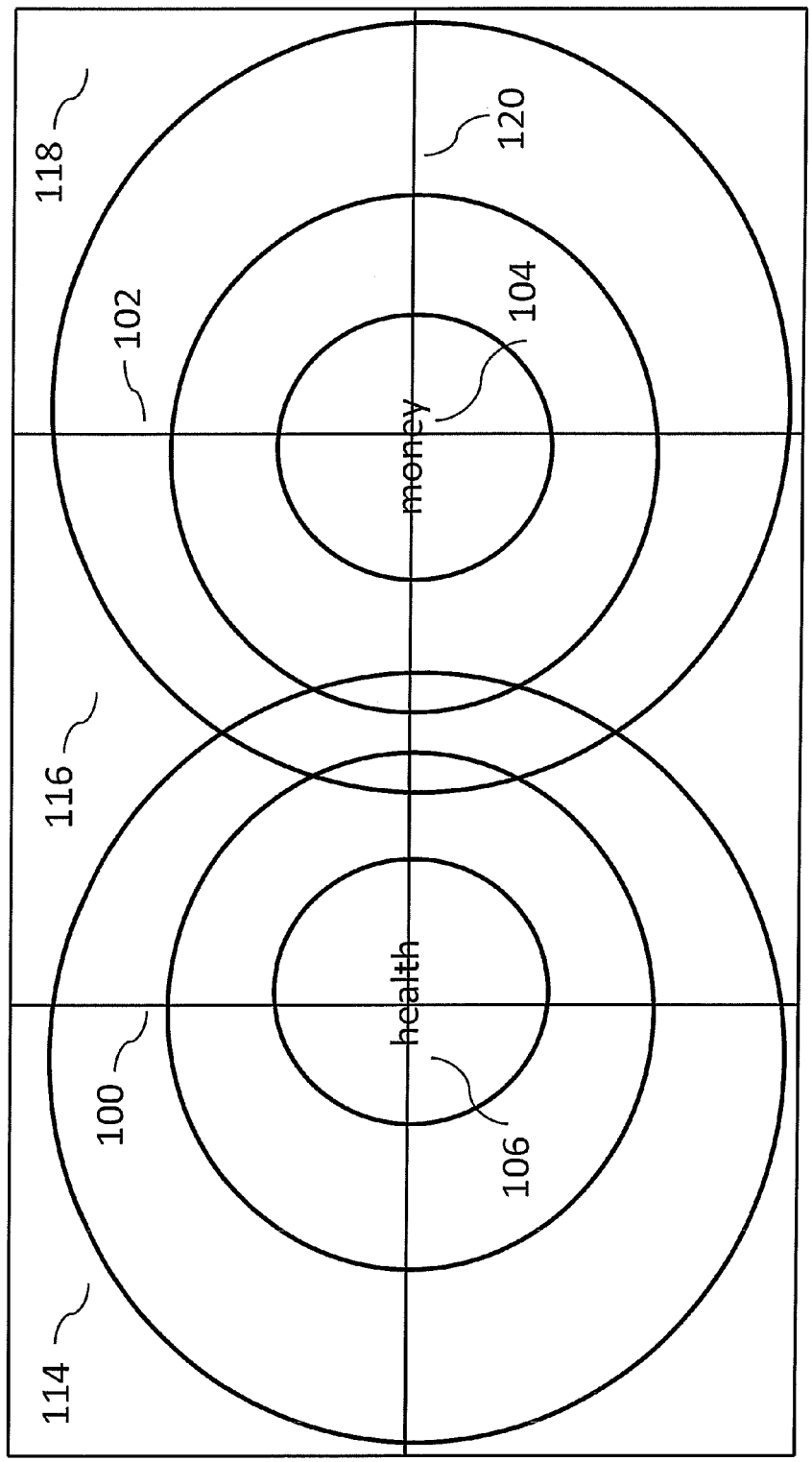
FIG. 3 schematically illustrates a concept for positioning the search strings on a map.

Such a positioning system may be implemented using a force-based attraction/repulsion system as schematically shown in FIG. 3. In an iterative fashion, the movement vectors of each unit to be positioned are updated according to their current position in relation to the other units. Hence, if a unit B is in the middle between units A and C, and there is an attractive force towards A and a repulsive force from C then B receives a strong movement impulse towards A. In the present application the units may be placed such that their relationship to the input units is clear at all times. Hence, the forces are modified to additionally take their global association strength to the input units into account. Furthermore, user actions may also be taken into account and the relative positions of the units may be updated in an interactive fashion to avoid cluttered areas of the display.

FIG. 3 shows search string concentric curves which define places of equal potential energy with regard to the above describe forces. For example, if both search strings are strongly related to a string, which would be indicated by a high relationship value, the string would be positioned by determining the intersection of two concentric curves which correspond to the respective relationship values. When no intersection would exist, the string would be placed at a connecting line between the search strings.

Figure 4:
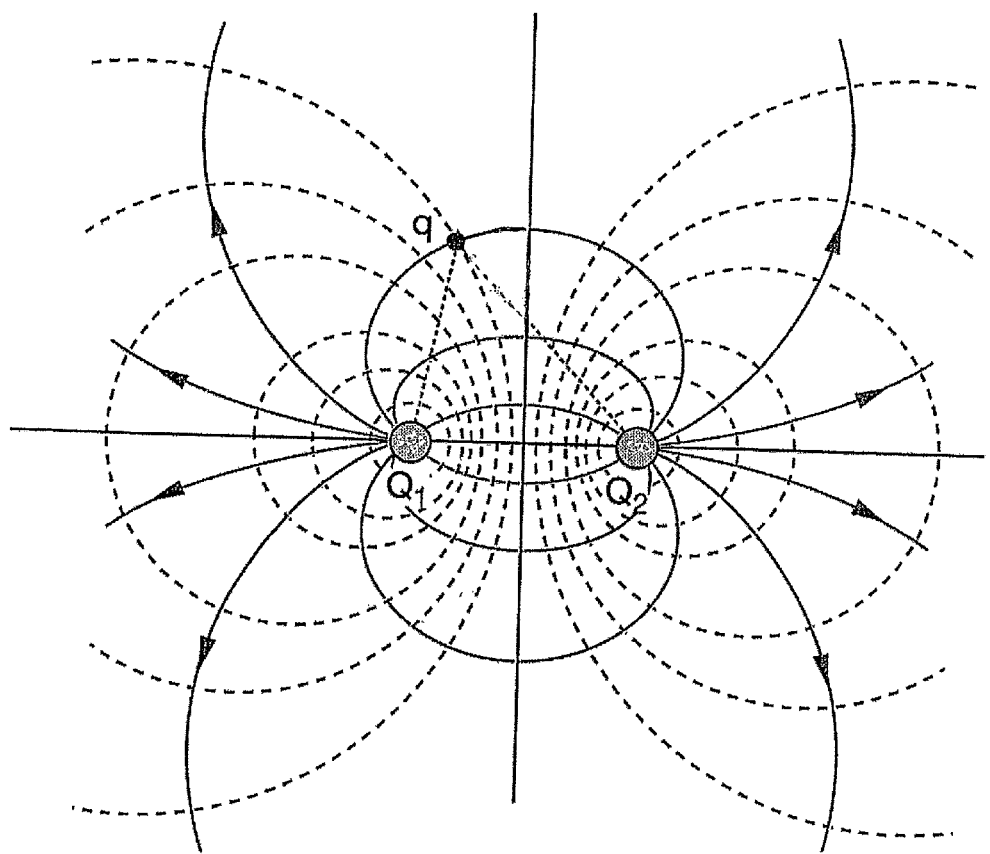
FIG. 4 schematically illustrates a further concept for positioning the search strings on a map.

FIG. 4 schematically illustrates a further concept for positioning the strings on a map. The map centers around two search strings, i.e. Q1 and Q2. A string q may be positioned on a curve that connects the search strings Q1 and Q2. The curve may be similar in shape to the trajectory of an electric charge traveling from a "positively charged" search string Q1 to a "negatively charged" search string Q2. The distance between the string q and the search strings Q1 and Q2 may be determined from the relationship values of q with regard to Q1 and Q2. In FIG. 4, q is positioned closer to Q1 than to Q2 which indicates that q is more related to Q1 than to Q2. Furthermore, a string that may be less related to Q1 and Q2 than the string q may be positioned at a curve that is further apart from the connecting line of Q1 and Q2, while a string that may be more related to Q1 and Q2 than the string q may be positioned at a curve that is nearer to the connecting line of Q1 and Q2.

Additionally to the positioning, a cluster or classification analysis may present the user of such a system with visual cues on underlying additional information dimensions. For example all depicted units may be classified into classes such as "good" or "bad" emotionality, their age in terms of when they were used or any other dimension. The results of such analysis may be represented by either coloring the graphical representations of the units or by coloring the spatial surroundings of the units (in the form of color gradients, or discrete clouds of any form). If no specific classes are provided, an automatic clustering process may come up with inherent differences in the underlying data. For example, if the displayed units are words, an underlying part of speech clustering mechanism could distinguish between names, nouns, verbs, etc. and color or even filter the displayed units accordingly.

The application may comprise a combination of the following aspects:
1. Given a system that stores a collection of entities such as documents, emails, websites or other content with discrete countable units and hence an analyzable structure.
2. User chooses two search strings, i.e. concepts or entities 3. The stored entities are analyzed as background knowledge (or corresponding data from a pre-analysis step is accessed)
4. A differential analysis is performed for each concept against the "background knowledge"
5. The two resulting unit sets are processed into three sets: one set containing units specifically related to concept 106 but not to 104, another specifically related to concept 104 but not to concept 106, and one shared set with units related both to 104 and 106.
6. Various methods for computing the positions are used ("forces", for example)
7. Results of these methods are combined
8. Words are positioned
9. words may be colored due to some underlying classification or clustering process (for example, emotionality and/or generality)
10. User selects one of these words to further process the document collection (e.g. by viewing documents that contain the word or by adding the word to reduce the set of documents analyzed and re-computing the words)

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. Method for facilitating the selection of an information source from a plurality of information sources, comprising:
providing two search strings to an electronic device;
obtaining, by the electronic device, strings and relationship values, wherein each relationship value defines a degree of semantic relationship between two strings or a string and a search string and wherein at least some of the strings match with elements in the information sources; and
displaying, by the electronic device, at least some of the matching strings on a two-dimensional map;
wherein the map comprises a first, a second and a third region, the first region comprising matching strings that have a non-zero relationship value only with regard to the first search string, the second region comprising matching strings that have a non-zero relationship value only with regard to the second search string and the third region comprising matching strings that have non-zero relationship values with regard to the first and the second search string,
wherein the map has the shape of a rectangle and the first, second and third regions are divided by two lines which are parallel to a first side of the rectangle and wherein the first, second and third regions are divided into six sub-regions by a further line which is parallel to a second side of the rectangle and wherein a matching string is placed at one side of the further line or at another side of the further line, depending on a property of the matching string.

2. Method according to claim 1, the method further comprising the steps of:
receiving, by the electronic device, a selection of a displayed matching string; and
searching information sources that comprise the selected matching string.

3. Method according to claim 1, wherein a relationship value for two strings is based, at least in part, on comparing a frequency distribution of one of the two strings in a text source having a known semantic relation to the other string of the two strings, with a global frequency distribution of the one of the two strings in a general text corpus.

4. Method according to claim 1, wherein a relationship value for two strings is based, at least in part, on analyzing distances of the two strings in a text corpus.

5. Method according to claim 1, wherein the search strings are displayed at specific points on the map and wherein the position of a matching string on the map relative to the position of the search strings is determined according to the relationship values of the matching strings with regard to the search strings.

6. Method according to claim 5, wherein the position of the matching string is determined by defining search string concentric closed curves on the map plane, wherein each closed curve represents a specific numeric value for a relationship value of the matching string and wherein the numeric values decrease from the inner curves to the outer curves and wherein the matching string is positioned upon an intersection point of each curve which corresponds to an relationship value of the matching string.

7. Method according to claim 6, wherein, if an intersection point of each curve which corresponds to a relationship value of the matching string does not exist, the matching string is positioned upon a connection line between the search strings.

8. Method according to claim 7, wherein the position of the matching string upon the connection line is determined according to the relationship values.

9. Method of claim 1, wherein small relationship values below a threshold are set to zero.

10. Method of claim 1, the method further comprising the steps of:
   receiving, by the electronic device, a selection of a displayed matching string; and
   replacing one search string with the selected matching string or adding the selected matching string to one of the search strings.

11. Method according to claim 10, the method further comprising the step of:
   repeating the method steps of claim 1 with the replaced or modified search string.

12. Method of claim 1, the method further comprising the step of:
   zooming into a portion of the map; and
   in response to zooming, displaying additional strings on the map, within the zoomed region.

13. A non-transitory computer readable medium comprising computer readable instructions, which when carried out by a computer, cause the computer to:
   provide two search strings to an electronic device;
   obtain, by the electronic device, strings and relationship values, wherein each relationship value defines a degree of semantic relationship between two strings or a string and a search string and wherein at least some of the strings match with elements in the information sources; and
   display, by the electronic device, at least some of the matching strings on a two-dimensional map;
   wherein the map comprises a first, a second and a third region, the first region comprising matching strings that have a non-zero relationship value only with regard to the first search string, the second region comprising matching strings that have a non-zero relationship value only with regard to the second search string and the third region comprising matching strings that have non-zero relationship values with regard to the first and the second search string
   wherein the map has the shape of a rectangle and the first, second and third regions are divided by two lines which are parallel to a first side of the rectangle and wherein the first, second and third regions are divided into six sub-regions by a further line which is parallel to a second side of the rectangle and wherein a matching string is placed at one side of the further line or at another side of the further line, depending on a property of the matching string.

14. System for facilitating the selection of an information source from a plurality of information sources, the system comprising
   a processor which is adapted to:
   provide two search strings to an electronic device;
   obtain, by the electronic device, strings and relationship values, wherein each relationship value defines a degree of semantic relationship between two strings or a string and a search string and wherein at least some of the strings match with elements in the information sources; and
   display, by the electronic device, at least some of the matching strings on a two-dimensional map;
   wherein the map comprises a first, a second and a third region, the first region comprising matching strings that have a non-zero relationship value only with regard to the first search string, the second region comprising matching strings that have a non-zero relationship value only with regard to the second search string and the third region comprising matching strings that have non-zero relationship values with regard to the first and the second search string
   wherein the map has the shape of a rectangle and the first, second and third regions are divided by two lines which are parallel to a first side of the rectangle and wherein the first, second and third regions are divided into six sub-regions by a further line which is parallel to a second side of the rectangle and wherein a matching string is placed at one side of the further line or at another side of the further line, depending on a property of the matching string.

* * * * *